(12) United States Patent
Asi et al.

(10) Patent No.: US 12,165,631 B2
(45) Date of Patent: Dec. 10, 2024

(54) KEYWORD-BASED DIALOGUE SUMMARIZER

(71) Applicant: Microsoft Technology Licensing, LLC, Redmond, WA (US)

(72) Inventors: Abedelkader Asi, Kfar Bara (IL); Royi Ronen, Tel Aviv (IL); Roy Eisenstadt, Be'er Sheva (IL); Dean Geckt, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 17/735,663

(22) Filed: May 3, 2022

(65) Prior Publication Data

US 2023/0360640 A1 Nov. 9, 2023

(51) Int. Cl.
| | |
|---|---|
| *G10L 15/08* | (2006.01) |
| *G06F 16/35* | (2019.01) |
| *G06F 40/35* | (2020.01) |
| *G06N 20/00* | (2019.01) |
| *G10L 15/22* | (2006.01) |

(52) U.S. Cl.
CPC .............. *G10L 15/08* (2013.01); *G06F 16/35* (2019.01); *G06F 40/35* (2020.01); *G06N 20/00* (2019.01); *G10L 2015/225* (2013.01)

(58) Field of Classification Search
CPC ......... G10L 15/22; G10L 15/08; G10L 15/26; G10L 2015/225; G10L 2015/088; G10L 13/03; G10L 15/063; G10L 15/1585; G10L 13/00; G10L 15/16; G06F 40/30; G06F 16/35; G06F 40/58
See application file for complete search history.

(56) References Cited

U.S. PATENT DOCUMENTS

| | | | | |
|---|---|---|---|---|
| 7,050,977 | B1 * | 5/2006 | Bennett | G10L 15/30 704/E15.047 |
| 8,468,244 | B2 * | 6/2013 | Redlich | G06Q 50/18 715/255 |
| 9,565,301 | B2 | 2/2017 | Lee et al. | |
| 9,753,918 | B2 * | 9/2017 | Waibel | G10L 15/06 |

(Continued)

FOREIGN PATENT DOCUMENTS

CN 108415959 B 6/2021

OTHER PUBLICATIONS

He et al., ("CTRLsum: Controllable text Summarization |Blog| Salesforce AI Research", Dec. 29, 2021, pp. 1-35, Dec. 29, 2021). (Year: 2021).*

(Continued)

*Primary Examiner* — Vijay B Chawan
(74) *Attorney, Agent, or Firm* — Holzer Patel Drennan

(57) ABSTRACT

A method of generating keyword-based dialogue summaries is provided. The method includes inputting a transcript of an audio conversation and a keyword into a machine learning model trained based on encodings representing the keyword and the transcript, generating computer-generated text different from and semantically descriptive of the transcript and semantically associated with the keyword, and outputting the computer-generated text in association with a selectable item selectable for inclusion of the computer-generated text in displayed text representing the transcript, the selectable item associated with the keyword.

20 Claims, 6 Drawing Sheets

(56) References Cited

U.S. PATENT DOCUMENTS

| | | | |
|---|---|---|---|
| 10,629,199 B1* | 4/2020 | Parthasarathy | G10L 19/167 |
| 10,685,664 B1* | 6/2020 | Kristjansson | G06F 3/167 |
| 11,062,704 B1* | 7/2021 | Kodish-Wachs | G06F 40/30 |
| 11,094,318 B1* | 8/2021 | Erickson | G10L 15/22 |
| 11,272,058 B2 | 3/2022 | Khafizov et al. | |
| 11,869,501 B2* | 1/2024 | Kodish-Wachs | G10L 15/1815 |
| 2007/0185717 A1* | 8/2007 | Bennett | G10L 15/30 |
| | | | 704/E15.047 |
| 2009/0254572 A1* | 10/2009 | Redlich | G06Q 10/10 |
| 2010/0250497 A1* | 9/2010 | Redlich | G06Q 10/06 |
| | | | 707/661 |
| 2015/0127321 A1* | 5/2015 | Waibel | G06F 40/58 |
| | | | 704/2 |
| 2017/0054837 A1 | 2/2017 | Choi et al. | |
| 2018/0130484 A1* | 5/2018 | Dimino, Jr. | H04N 21/234336 |
| 2019/0139543 A1* | 5/2019 | Rahmel | G10L 15/08 |
| 2019/0180740 A1* | 6/2019 | Nandy | G10L 15/30 |
| 2020/0050654 A1* | 2/2020 | Mertens | G10L 15/22 |
| 2021/0149937 A1* | 5/2021 | Coulombe | G06F 40/253 |
| 2022/0038581 A1* | 2/2022 | Shih | H04M 7/0087 |
| 2022/0067284 A1 | 3/2022 | He et al. | |
| 2022/0270610 A1* | 8/2022 | Spitzer-Williams | G10L 15/26 |
| 2022/0293095 A1* | 9/2022 | Kim | G10L 15/1815 |
| 2023/0360640 A1* | 11/2023 | Asi | G06F 40/35 |

OTHER PUBLICATIONS

Asi, et al., "An End-to-End Dialogue Summarization System for Sales Calls", In Proceedings of NAACL-HLT 2022: Industry Track Papers, Jul. 10, 2022, pp. 45-53.

HE, et al., "CTRLsum: Towards Generic Controllable Text Summarization", In Repository of arXiv:2012.04281v1, Dec. 8, 2020, 35 Pages.

He, et al., "CTRLsum: Controllable Text Summarization", Retrieved from: https://blog.salesforceairesearch.com/ctrlsum/, Dec. 29, 2021, 8 Pages.

"International Search Report and Written Opinion Issued in PCT Application No. PCT/US2023/013555", Mailed Date: May 19, 2023, 11 Pages.

"Call Highlights Custom Report", Retrieved From: https://support.callrail.com/hc/en-us/articles/360032794271-Call-Highlights-Custom-Report, Sep. 18, 2020, 3 Pages.

"Call History Summary Report", Retrieved From: https://help.infusionsoft.com/help/call-history-summary-report, Jan. 29, 2020, 2 Pages.

"Vi Call Summary", Retrieved From: https://help.dialpad.com/hc/en-us/articles/360024602212-Vi-Call-Summary, Aug. 3, 2020, 7 Pages.

Coffman, Liz, "Create Highlights", Retrieved From: https://support.grain.com/en/articles/5729145-create-highlights, Apr. 7, 2022, 3 Pages.

\* cited by examiner

```
                                    ┌─ 500
                                    │
                                    ▼
```

Input a portion of a transcript of an audio conversation and a predefined keyword into a machine learning model trained based on a first encoding representing the keyword and a second encoding representing text of the portion of the transcript
502

Generate, by the trained machine learning model, computer-generated text different from and semantically descriptive of at least the portion of the transcript, the computer-generated text semantically associated with the inputted predefined keyword, based on the inputted predefined keyword and the inputted portion of the transcript
504

Output the computer-generated text in association with a selectable item selectable for inclusion of the computer-generated text in displayed text representing the transcript, the selectable item associated with the predefined keyword
506

FIG. 5

KEYWORD-BASED DIALOGUE SUMMARIZER

BACKGROUND

Businesses rely on telecommunications to communicate with clients. Automation can assist agents of the businesses by transcribing the conversations to provide a record of the calls. Agents may benefit from the automated generation of summaries of all or portions of call transcripts. The automation can provide an agent with easy-to-add highlights that may save the agent time and allow the agent to service more clients.

SUMMARY

According to the described technology, keyword-based dialogue summaries are generated by inputting a transcript of an audio conversation and a keyword into a machine learning model trained based on encodings representing the keyword and the transcript, generating computer-generated text different from and semantically descriptive of the transcript and semantically associated with the keyword, and outputting the computer-generated text in association with a selectable item selectable for inclusion of the computer-generated text in displayed text representing the transcript, the selectable item associated with the keyword.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 5 illustrates example operations for generating keyword-based dialogue summaries.

DETAILED DESCRIPTIONS

Figure 1:
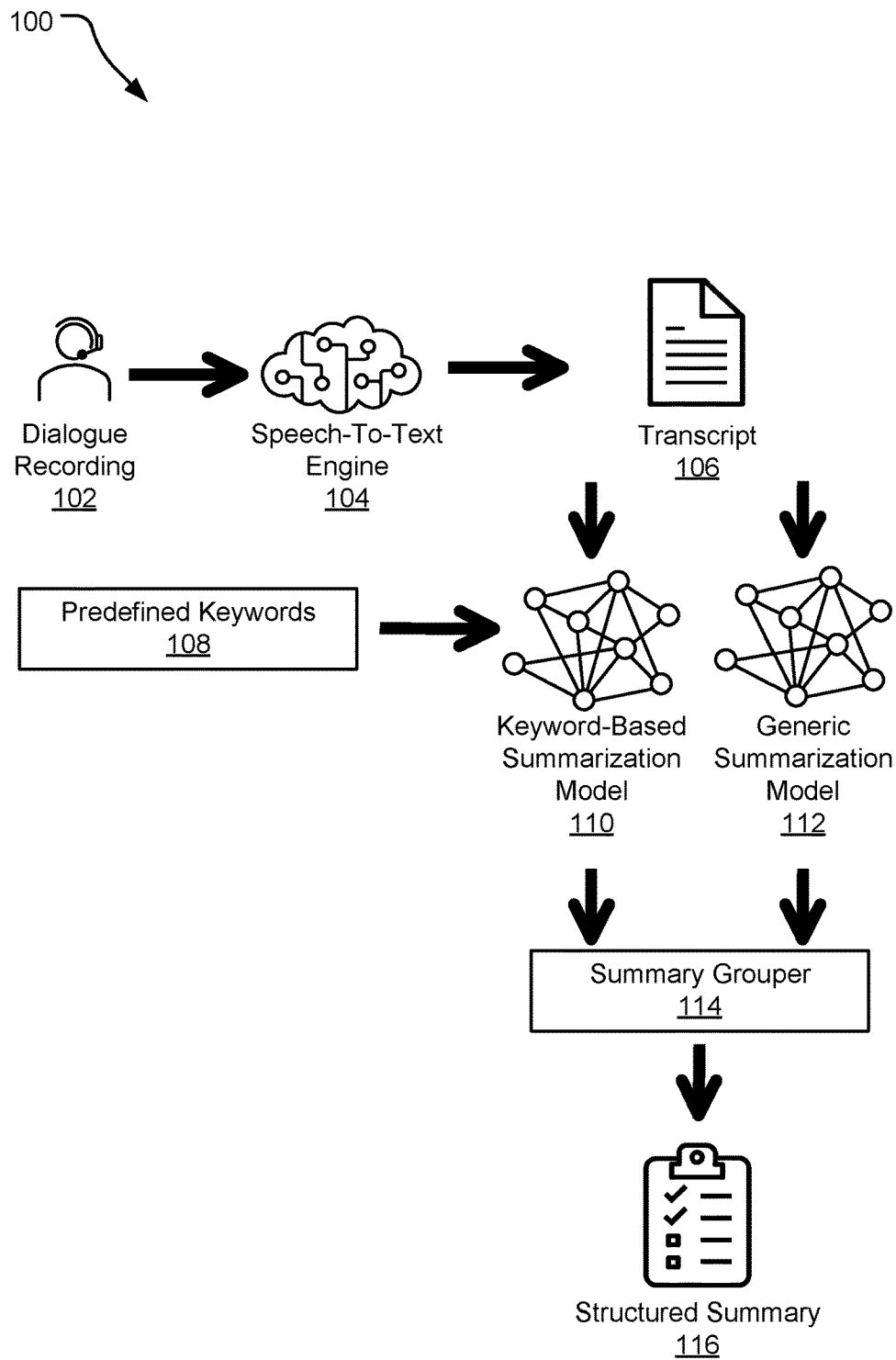
FIG. 1 illustrates an example system for generating keyword-based dialogue summaries.

Clients rely on telecommunications with agents of businesses for services. For example, the clients may have difficulty navigating the predefined help available on business websites, or the clients may require information not provided on the business websites. When communicating with a client, an agent of the business may be expected to provide summaries and follow-up inquiries after a session with a client. Generating these summaries can be time-consuming, and the fidelity of the information can be limited by the memory of the agent. Some of the issues with manual call servicing can be alleviated with the automation of call servicing. For example, the automated systems can receive the audio recording of the communication, whether in real-time or after the communication is terminated, and transcribe the recorded words. Sifting through a transcribed conversation for exchanges that have transactional significance. Summarization models may be utilized to present automated summary highlights to present the agents with an abridged version of the conversation. The summary highlights themselves may be generic and undirected to the transaction. For example, the topics discussed may be unrelated to a transaction for which the agent would be more likely to take notes. Further, the summaries may fail to establish respective roles of the generators of the discussion (e.g., users) in the conversations to isolate the objectives of the respective speakers.

The presently disclosed technology provides a keyword-based summarization model that provides summaries associated with predefined keywords. The predefined keywords may be preselected to be relevant to important aspects of a transaction between a first user (e.g., an agent) and a second user (e.g., a client). For example, the keywords may be industry-specific and/or preselected by the entity that employs the first user such that isolating portions of the conversation associated with the keywords (whether explicitly or semantically) for summarization provides the first user with highlights that are more relevant to the transaction.

A language processing machine learning model may be used to determine the summaries based on the predefined keywords. The machine learning model may be trained to produce computer-generated text representing summary highlights associated with the predefined keywords based on the input of a portion of a conversation transcript and the predefined keywords. The predefined keywords may be discretely encoded (e.g., using a specific token associated with the keyword) separately of the text of a portion of the transcript and may be introduced with the encoded text of the portion of the transcript. The summary highlights may be output in association with selectable items to be presented in a user interface. The first user may select the selectable items to add the computer-generated text to a summary of the conversation between the users. The selectable items may be displayed in a first portion of a user interface. Upon selection, computer-generated text associated with a selectable item may be displayed in a second portion of the user interface concurrently displayed with the first portion of the user interface based on the first user selecting the selectable item. Upon selection, the selectable item may also be removed from the first portion of the user interface.

In implementations, roles of speech or text generators (e.g., users such as an agent and/or client) may be assigned to the text of a conversation transcript and further used as an input to the machine learning model to add a role-based dimension to the produced computer-generated text. For example, the roles may be represented as discrete tokens added to the encoding of the text and/or the encoding of the predefined keywords. Assigning roles can prevent confusion in summaries in which two or more users participate.

FIG. 1 illustrates an example system 100 for generating keyword-based dialogue summaries. In the system 100, a dialogue recording 102 (e.g., typed or spoken) including dialogue between at least two users is recorded. A speech-to-text engine 104 transforms the call recording into a transcript 106. In implementations, the speech-to-text engine 104 generates the transcript 106 to include roles of the generators of text (e.g., users) in the recorded conversation. For example, the roles may include that the users are different people or may be specific to roles within the context of the conversation (e.g., an agent and a client). The system 100 may be supplied with predefined keywords 108. The predefined keywords 108 may be selected by one of the users or by an entity that controls one of the users, or the predefined keywords 108 may be automatically generated based on a determined context of the conversation or a known context associated with the entity (e.g., specific to a sales entity).

The predefined keywords 108 and the transcript 106 (e.g., including the role-based data) are inputted into a keyword-based summarization model 110 that may include a machine learning model. The keyword-based summarization model 110 may be trained to encode the predefined keywords 108 as discrete encoded entities encoded separately from the text of the transcript 106. The keyword-based summarization model 110 may input the keyword encodings and the encoding of the text of the transcript 106 together to a transformation encoder of the key-word based summarization model. The keyword-based summarization model 110 then generates computer-generated text. In implementations, the computer-generated text may be different from and semantically descriptive of a portion of the transcript 106 (e.g., to function as a summary highlight to be selectively included in a summary of the transcript 106). The computer-generated text may be additionally or alternatively semantically associated with the predefined keywords 108 themselves.

In implementations, the Transcript 106 is also introduced to a generic summarization model 112 which may or may not have role-based features. The generic summarization model 112 does not take the predefined keywords as inputs to be encoded separately from the text of the transcript 106. The generic summarization model 112 may output computer-generated text representing generic summary highlights that are not based on input keywords encoded separately of the text of the transcript 106.

The computer-generated text (whether keyword-based or generic) is then introduced to a summary grouper 114 to group the computer-generated text for display in a user interface. The summary grouper 114 may assess the computer-generated text for redundancy and may remove redundant summarization points. For example, in implementations with both key-word based and generic computer-generated text, the summary grouper 114 may remove entries that are redundantly generated by the keyword-based summarization model 110 and the generic summarization model. The summary grouper 114 may also aggregate multiple computer-generated text strings associated with a single predefined keyword to be placed under a single computer-generated text grouping.

The computer-generated text that is output by the summary grouper to yield a structured summary 116 of the transcript. In implementations, the computer-generated text is output in association with a selectable item selectable for inclusion of the associated computer-generated text in displayed text representing the transcript 106. Each selectable item may be presented in a first portion of a user interface. Upon selection of a selectable item, the associated computer-generated text is displayed in a second portion of the user interface as an element of the structured summary 116 of the transcript 106. After selection of the selectable item, the selectable item may be removed from the first portion of the user interface.

While implementations have been described in a sales context in which the transcript 106 is representative of a dialogue recording 102 between an agent and a client for a sales transaction, other applications of the presently disclosed technology are contemplated. For example, the system 100 can be utilized in a technical support context. The roles may still be an agent and a client. In this example, the predefined keywords 108 could be directed to the technical support context. Such predefined keywords may include one or more of "FAQs," "plugged," "refresh," and the like that are relevant to answering an inquiry in the technical support space. Another example context is a recruiting context. The roles in the recruiting context may include a recruiter and a job candidate. In a recruiting context, the predefined keywords 108 may include one or more of "GPA," "employment history," "terminated," "misconduct," professional license," and the like. The system 100 can be applied to any multiuser conversation whether it be from an audio recording or from (visual) text-based messaging, and the predefined keywords 108 can be based on the context whether selected by a user or predefined based on the context (which may be selectable by a user as well or discernable by the system 100 based on the content of the transcript 106).

Figure 2:
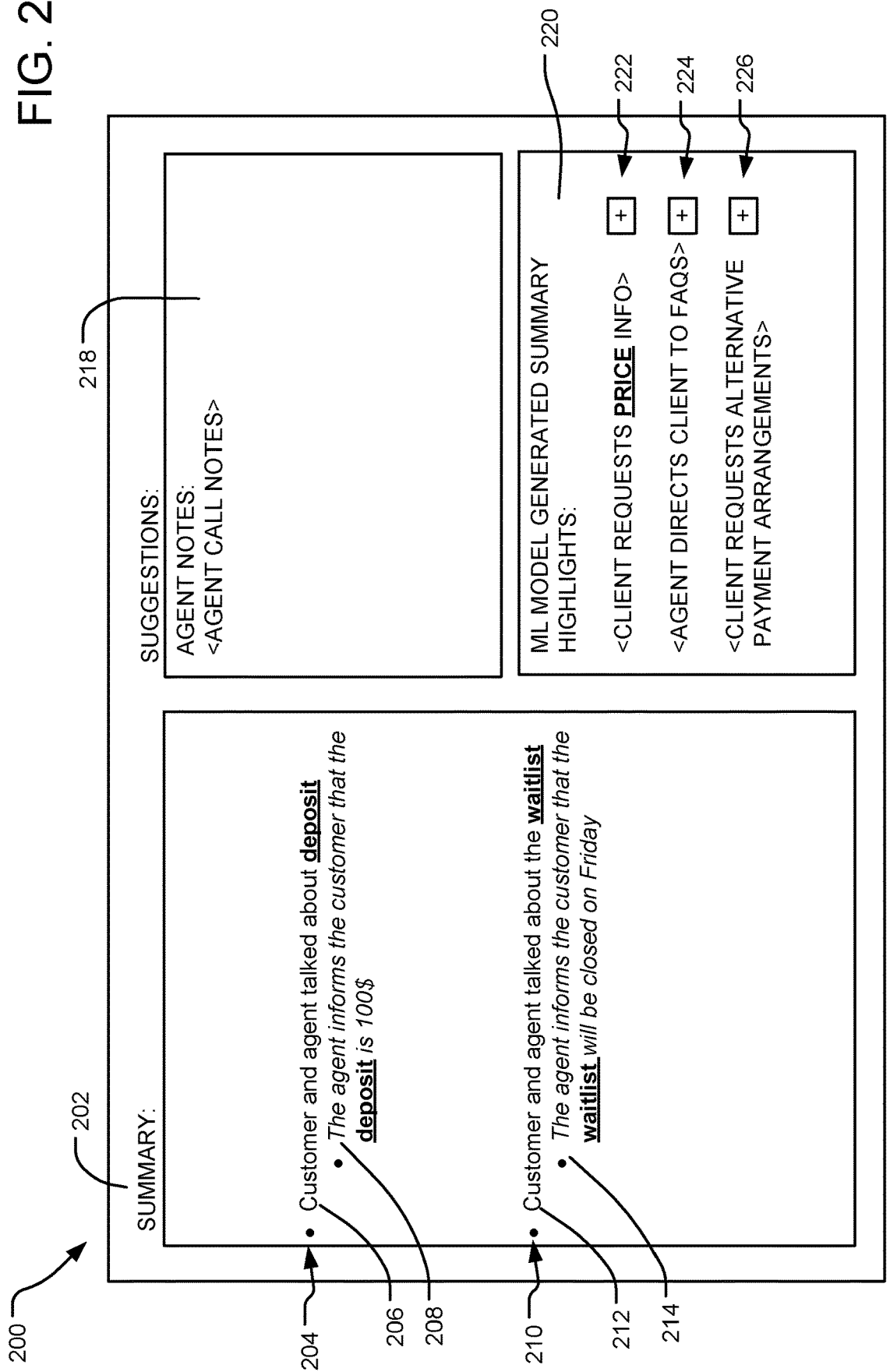
FIG. 2 illustrates an example user interface of a system for generating keyword-based dialogue summaries.

FIG. 2 illustrates an example user interface 200 of a system for generating keyword-based dialogue summaries. The user interface 200 includes a first portion 202 for displaying a structured summary of a transcript. The user interface 200 includes a second portion 220 for displaying selectable items 222, 224, and 226 representing machine learning model-generated summary highlights (e.g., computer-generated text). The user interface 200 further includes a third portion 218 for a user to introduce manually entered notes regarding a conversation between the user and at least one other user. These notes may be selectively added to the first portion 202.

The first portion 202 already includes selected computer-generated text groupings 204 and 210 that group associated computer-generated text that may have previously been represented by selectable items in the second portion 220 of the user interface 200 based on the predefined associated keywords. A first selected computer-generated text grouping 204 includes a first predefined statement 206 associated with the predefined keyword, "deposit." The first selected computer-generated text grouping 204 also includes first computer-generated text 208 associated with the predefined keyword, "deposit," illustrated as a bullet point associated with the first selected computer-generated text grouping 204.

Similarly, a second selected computer-generated text grouping 210 includes a second predefined statement 212 associated with the predefined keyword, "waitlist." The second selected computer-generated text grouping 210 also includes second computer-generated text 214 associated with the predefined keyword, "waitlist," illustrated as a bullet point associated with the second selected computer-generated text grouping 210.

The selectable items 222, 224, and 226 may be displayed in the second portion 220 to allow a user to select one or more of the selectable items 222, 224, and 226 and display computer-generated text associated with the selectable items 222, 224, and 226 in the first portion 202 in association with an appropriate grouping (e.g., a keyword-based grouping) or in isolation. A first selectable item 222 differs from second and third selectable items 224 and 226 in that the first selectable item 222 represents a keyword-based computer-generated text string, associated with the keyword, "PRICE." Selecting the first selectable item 222 may cause the computer-generated text associated with the selectable item 222 to be displayed in the first portion 202. The associated computer-generated text may be displayed as an element of a computer-generated text grouping associated with the keyword, "price" (not illustrated) in a manner similar to the first computer-generated text-grouping 204.

Selection of the remaining (non-keyword-based) selectable items may cause associated computer-generated text strings to be displayed in the first portion 202, but the associated computer-generated text may not be grouped into groupings based on a predefined keyword. In implementations, the selectable items 222, 224, and 226 may include some or all of the text of the associated computer-generated text or may include a summarization of the computer-generated text. As indicated, the first selectable item 222 generated based on a predefined keyword may include an indication (e.g., an underline, boldening, italicization, coloring, or another display differentiator) that emphasizes the predefined keyword.

In implementations, elements of the computer-generated text groupings 204 and 210 and the selectable items 222, 224, and 226 include role-based data. For example, the first selectable item 222 specifies that the "client" requests price info. The second selectable item 224 specifies that the agent directs the client to a frequently asked questions section. Similarly, the first predefined statement 206 specifies that the customer and agent talked about the keyword, "deposit," and the associated first computer-generated text 208 specifies that the agent informs the customer that the deposit is $100.

Figure 3:
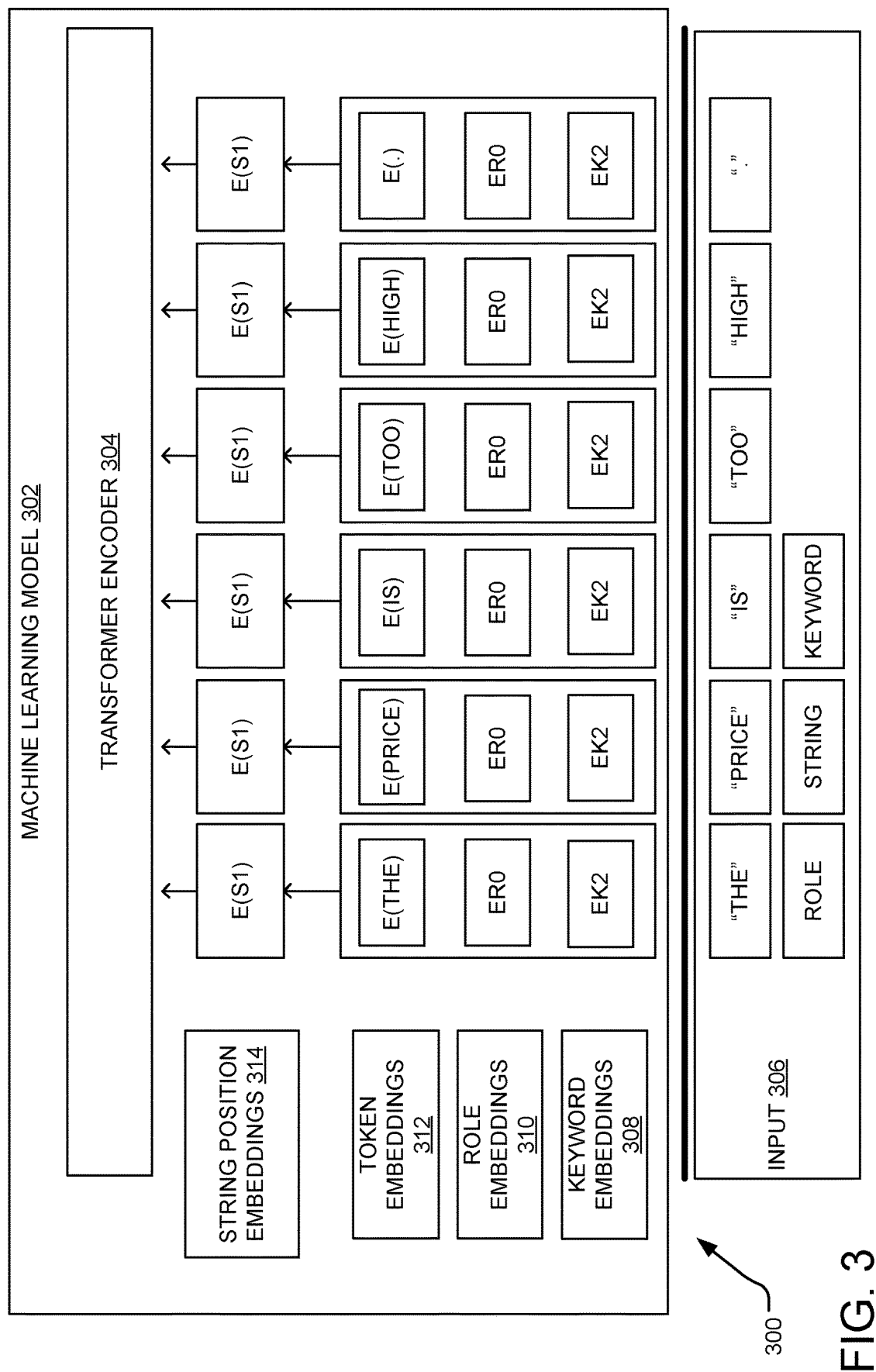
FIG. 3 illustrates an example encoding environment.

FIG. 3 illustrates an example encoding environment 300. In the environment, a machine learning model 302 receives input 306 of a text string. In implementations, the text string may be a portion of a transcript of a conversation (e.g., typed or audio conversation). The illustrated input 306 includes the string, "THE PRICE IS TOO HIGH." In implementations, the input 306 further includes one or more of a role (e.g., first user, second user, agent, or client), a string identifier (e.g., a number of the string in sequence or by other indexing), and a predefined keyword.

The text string of input 306 is encoded to provide token embeddings 312, with each token representing a word in the input 306. Implementations are also contemplated in which the input is tokenized at a character or chunk level instead of at a word level as illustrated. The token embeddings 312 may be predefined vectors the encoders associate with the encoded words, rendering the input 306 as tokens E(THE), E(PRICE), E(IS), E(TOO), E(HIGH), E(.).

One or more of the token embeddings 312 may be associated with other encoded elements. For example, if the machine learning model 302 is operable to generate keyword-based computer-generated text, the token embeddings may be associated with keyword embeddings 308. The system may have predefined tokens associated with the predefined keywords including the keyword of the input 306. In the illustrated implementation, the predefined keyword from the input 306 to be input with the token embeddings 312 is encoded as EK2. The encoding tokens for the predefined keywords may be different from or the same as the encoding of the same keywords used for the token embeddings 312.

In implementations, role embeddings 310 may be introduced to one or more of the words (or on a string, statement, or sentence basis). The roles may be defined in a transcript by a speech-to-text engine. In the illustrated example, the encoding token ER0 is associated with a client who is complaining that the prices are too high. In a conversation with a second user, the second user may be associated with a different encoding token, ER1, which would be used in association with strings attributable to the second user.

In implementations, the token embeddings 312 may be further associated with string position embeddings 314. In the illustrated implementation, the string position embeddings 314 indicate that the input 306 is from a string encoded as E(S1). The string may be parsed at a sentence level (e.g., E(S1) represents a single sentence), a statement level (e.g, separated by a predefined pause in conversation), a string level, or by turn (e.g., text representing a user's turn in a conversation before another user speaks). A speech-to-text engine may be used to parse the strings at one or more of the different specified levels before the strings are introduced in the input 306.

The token embeddings 312 representing the text string of the input 306 are inputted with one or more of the keyword embeddings 308, role embeddings 310, and string position embeddings 314 into a transformer encoder 304 of the machine learning model. The transformer encoder 304 utilizes a machine learning language processing model to generate computer-generated text. In implementations in which the input 306 includes a predefined keyword as a separately encoded element input as a keyword embedding 308, the computer-generated text generated may be keyword-based computer-generated text.

The machine learning model 302 (and/or its transformer encoder 304) may be trained using deep learning techniques. For example, in some implementations, the machine learning model 302 is operable and trained to assign factors or weights to potential summarization words based on the words and/or phrases of the segment and/or on other summarization words that have already been generated. The machine learning model 302 may then generate the summarization word based on those assigned factors and weights. Further, in some examples, the generating the summarization word includes extracting or otherwise determining embedding data from words of the obtained communication transcript segment.

In an implementation, the machine learning model 302 may be trained by inputting text transcripts and keywords as data labeled with predetermined summaries including or otherwise associated with the predefined keywords as target values. For example, a text transcript or portion thereof may be input into the machine learning model 302 with a predefined keyword. The resulting output computer-generated text string may be compared with a predetermined summary of the transcript or portion of the transcript associated with the keyword. A loss may be determined based on the comparison. The loss may then be backpropagated through the machine learning model 302. These loss operations may be repeated over a large corpus of data and/or over a number of iterations, batches, and/or epochs until the loss (e.g., aggregate loss) is reduced to satisfy a convergence condition. Any loss function known in the art may be used. The machine learning model 302 may further be validated with a different dataset to ensure that the machine learning model 302 does not overfit the data used in training. In implementations, the text transcript data may include, or the machine learning model 302 may derive role-based data and/or string position data to be used in training.

The training of the machine learning model 302 may introduce semantic links between the inputted portions of transcripts and the outputted summaries via the inputted keywords. Further, by using predetermined summary strings (or representations thereof) as targets, the predetermined summaries may be largely replicated and maintain the semantic link between the computer-generated text summaries and the predefined keywords. In implementations, the predetermined summaries explicitly include the keywords. Because o the semantic context the training introduces, portions of the transcript that do not include a predefined keyword may be sufficiently semantically related to be associated with a keyword by a model. For example, a statement, "how much does it cost" may be associated with a keyword, "price." A keyword-based computer-generated output using this semantic link may recite "the customer inquired about the price," despite the word price not appearing in the portion of the transcript. Machine learning models 302 may be generated for specific contexts in which the predefined keywords are used. For example, a particular machine learning model 302 may be used in a sales context where a sales entity may select or otherwise be provided (based on an identification of the type of sales entity) predefined keywords that are contextually related to the entity utilizing the machine learning model 302 to generate the keyword-based computer generated-text.

The structure of the machine learning model 302 may include without limitation, one or more of data mining algorithms, artificial intelligence algorithms, masked learning models, natural language processing models, neural networks, artificial neural networks, perceptrons, feed-forward networks, radial basis neural networks, deep feed-forward neural networks, recurrent neural networks, long/short term memory networks, gated recurrent neural networks, autoencoders, variational autoencoders, denoising autoencoders, sparse autoencoders, Bayesian networks, regression models, decision trees, Markov chains, Hopfield networks, Boltzmann machines, restricted Boltzmann machines, deep belief networks, deep convolutional networks, genetic algorithms, deconvolutional neural networks, deep convolutional inverse graphics networks, generative adversarial networks, liquid state machines, extreme learning machines, echo state networks, deep residual networks, Kohonen networks, support vector machines, federated learning models, and neural Turing machines. In implementations, the machine learning algorithm may be trained by an inference model training method. In this specification, examples of training methods (e.g., inferential and/or machine learning methods) can include, without limitation, one or more of masked learning modeling, unsupervised learning, supervised learning, reinforcement learning, self-learning, feature learning, sparse dictionary learning, anomaly detection, robot learning, association rule learning, manifold learning, dimensionality reduction, bidirectional transformation, unidirerctional tansformation, gradient descent, autoregression, autoencoding, permutation language modeling, two-stream self attenuation, federated learning, absorbing transformer-XL, natural language processing (NLP), bidirectional encoder representations from transformers (BERT) models and variants (e.g., RoBERTa, XLM-RoBERTa, and DistilBERT, ALBERT, CamemBERT, ConvBERT, DeBERTA, DeBERTA-v2, FlauBERT, I-BERT, herBERT, BertGeneration, BertJapanese, Bertweet, MegatronBERT, PhoBERT, MobileBERT, SqueezeBERT, BART, MBART, MBART-50BARThez, BORT, or BERT4REC), Allegro, cross-lingual language model (XLM) and variants (e.g., XLNet, XLM-ProphetNet, XLSR-Wav2Vec2, and Transformer XL), Auto Classes, BigBird, BigBirdPegasus, Blenderbot, Blenderbot Small, CLIP, CPM, CTRL, DeiT, DialoGPT, DPR, ELECTRA, Encoder Decoder Models, FSMT, Funnel Transformer, LayoutLM, LED, Longformer, LUKE, LXMERT, MarianMT, M2M100, MegatronGPT2, MPNet, MTS, OpenAl GPT, OpenAl GPT2, GPT Neo, Pegasus, ProphetNet, RAG, Reformer, Speech2Text, T5, TAPAS, Vision Transformer (ViT), OpenAl, GPT3, and Wav2Vec2.

Figure 4:
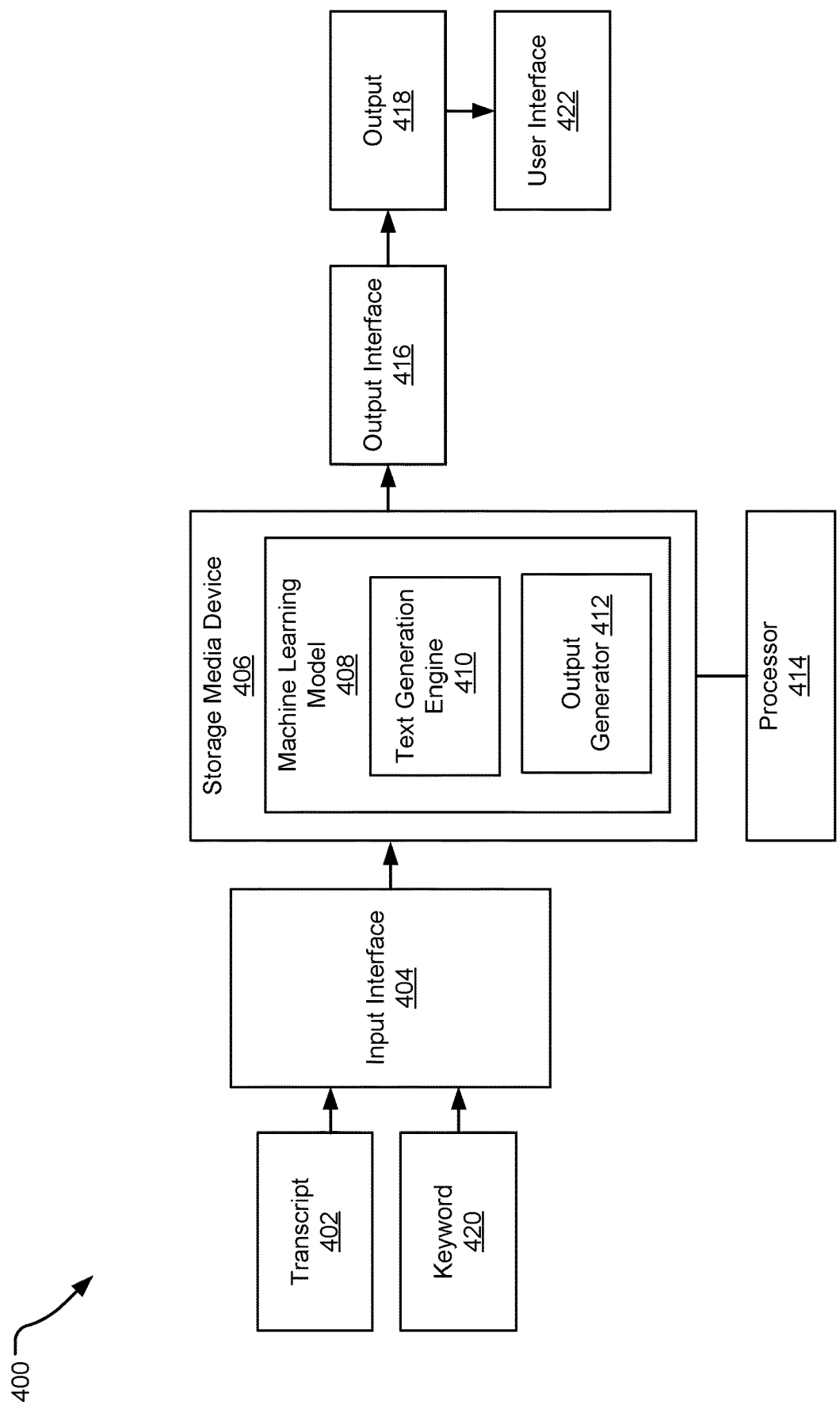
FIG. 4 illustrates an example system for generating keyword-based dialogue summaries.

FIG. 4 illustrates an example system 400 for generating keyword-based dialogue summaries. A transcript 402 of an audio or text conversation and a predefined keyword 420 are inputted via an input interface 404 to a storage media device 406 storing a machine learning model 408. The storage media device is coupled to a processor 414 that executes data stored in the storage media device 406. In an implementation, the machine learning model 408 is trained based on a first encoding representing the predefined keyword and a second encoding representing text of a portion of a different transcript (not illustrated).

The machine learning model 408 includes a text generation engine executable by the processor and operable to generate computer-generated text different from and semantically descriptive of at least the portion of the transcript 402, the computer-generated text semantically associated with the predefined keyword, based on the predefined keyword and the portion of the transcript 402. The machine learning model 408 further includes an output generator 412 executable by the processor 414 and operable to output the computer-generated text in association with a selectable item selectable for inclusion of the computer-generated text in displayed text representing the transcript 402 as output 418 via an output interface 416. In an implementation, the selectable item is associated with the predefined keyword. Output interface 416 may be coupled to a user interface 422 (e.g., displayed on a display) to allow a user to select the selectable item and include the computer-generated test to a summary of the transcript 402.

FIG. 5 illustrates example operations 500 for generating keyword-based dialogue summaries. An inputting operation 502 inputs a portion of a transcript of an audio conversation and a predefined keyword into a machine learning model. In implementations, the machine learning model is a keyword-based summarization machine learning model trained based on a first encoding representing the predefined keyword and a second encoding representing text of the portion of the transcript.

The predefined keyword and the transcript (e.g., including the role-based data) are inputted into a keyword-based summarization machine learning model. The keyword-based summarization model may be trained to encode the predefined keyword as a discrete encoded entity encoded separately from the text of the transcript. The keyword-based summarization machine learning model may input the keyword encodings and the encoding of the text of the transcript together to a transformation encoder of the key-word based summarization model.

In implementations, the portion of the transcript is also introduced to a generic summarization model which may or may not have role-based features. The generic summarization model does not take the predefined keywords as inputs to be encoded separately from the text of the transcript. The generic summarization model may output computer-generated text representing generic summary highlights that are not based on input keywords encoded separately of the text of the transcript.

A generating operation 504 generates, by the trained machine learning model, computer-generated text different from and semantically descriptive of at least the portion of the transcript based on the inputted predefined keyword and the inputted portion of the transcript.

The keyword-based summarization model generates computer-generated text. In implementations, the computer-generated text may be different from and semantically descriptive of a portion of the transcript (e.g., to function as a summary highlight to be selectively included in a summary of the transcript). The computer-generated text may be additionally or alternatively semantically associated with the predefined keywords themselves.

An outputting operation 506 outputs the computer-generated text in association with a selectable item selectable for inclusion of the computer-generated text in displayed text representing the transcript, the selectable item associated with the predefined keyword.

In implementations, the selectable item may be transmitted to and displayed on a user's device in a user interface. The user interface may include a first portion for displaying a structured summary of a transcript and a second portion for displaying the outputted selectable items representing the computer-generated text.

Selectable items may be displayed in the second portion to allow a user to select one or more of the selectable items and display computer-generated text associated with the selectable items in the first portion in association with an appropriate grouping (e.g., a keyword-based grouping) or in isolation. Both keyword-based and generic selectable items are contemplated and may be displayed in the second portion. A selectable item generated based on a predefined keyword may include an indication (e.g., an underline, boldening, italicization, coloring, or another display differentiator) that emphasizes the predefined keyword.

In response to the selection of the keyword-based selectable item, the associated computer-generated text may be displayed in the first portion as an element of a computer-generated text grouping associated with a predefined keyword. The groupings and associated text may be elements of a structured summary. In implementations, each computer-generated text grouping includes a first predefined statement associated with the predefined keyword, "deposit." In implementations, a selected computer-generated text grouping also includes computer-generated text associated with a predefined keyword. In implementations, elements of the groupings and the selectable items include role-based data.

Selection of the remaining (non-keyword-based) selectable items may cause associated computer-generated text strings to be displayed in the first portion, but the associated computer-generated text may not be grouped into groupings based on a predefined keyword. In implementations, the selectable items may include some or all of the text of the associated computer-generated text or may include a summarization of the computer-generated text.

While implementations have been described in a sales context in which the transcript is representative of a dialogue recording between an agent and a client for a sales transaction, other applications of the presently disclosed technology are contemplated. For example, the system can be utilized in a technical support context. The roles may still be an agent and a client. In this example, the predefined keywords could be directed to the technical support context. Such predefined keywords may include one or more of "FAQs," "plugged," "refresh," and the like that are relevant to answering an inquiry in the technical support space. Another example context is a recruiting context. The roles in the recruiting context may include a recruiter and a job candidate. In a recruiting context, the predefined keywords may include one or more of "GPA," "employment history," "terminated," "misconduct," professional license," and the like. The system can be applied to any multiuser conversation whether it be from an audio recording or from (visual) text-based messaging, and the predefined keywords can be based on the context whether selected by a user or predefined based on the context (which may be selectable by a user as well or discernable by the system based on the content of the transcript).

Figure 6:
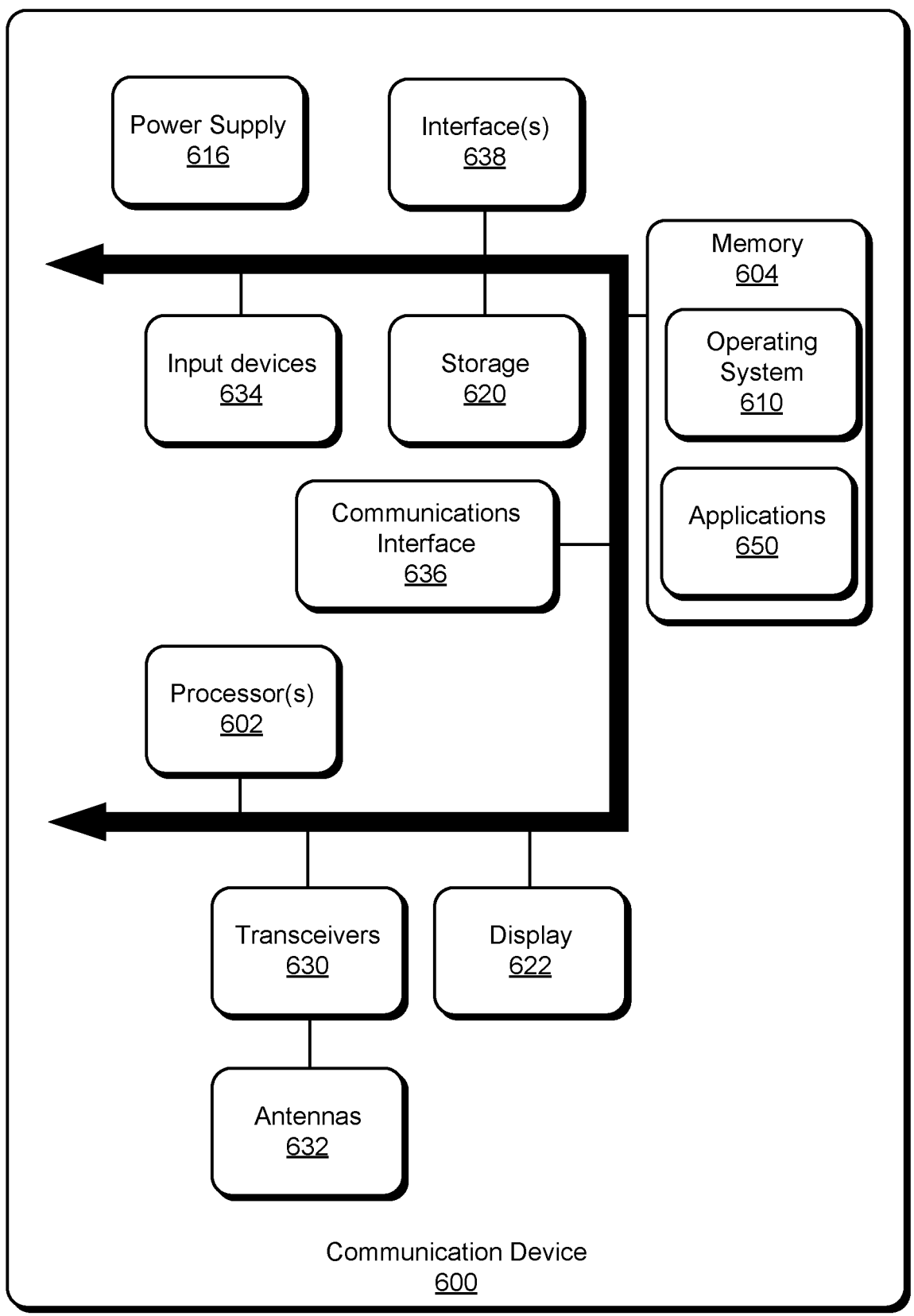
FIG. 6 illustrates an example computing device for implementing the features and operations of the described technology.

FIG. 6 illustrates an example computing device 600 for implementing the features and operations of the described technology. The computing device 600 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 600 includes one or more processor(s) 602 and a memory 604. The memory 604 generally includes both volatile memory (e.g., RAM) and nonvolatile memory (e.g., flash memory). An operating system 610 resides in the memory 604 and is executed by the processor(s) 602.

In an example computing device 600, as shown in FIG. 6, one or more modules or segments, such as applications 650, a speech-to-text engine, a keyword-based, a summarization model, a generic summarization model, a summary grouper, a transformer encoder, a machine learning model, and an inferential model are loaded into the operating system 610 on the memory 604 and/or storage 620 and executed by processor(s) 602. The storage 620 may include one or more tangible storage media devices and may store a dialogue recording, a transcript, a keyword-based computer-generated text string, a generic computer-generated text string, a structured summary, a selectable item, a predefined keyword, a manually entered agent note, a selected computer-generated text grouping, a predefined state associated with a predefined keyword, input strings, token embeddings, token position embeddings, role embeddings, keyword embeddings, locally and globally unique identifiers, requests, responses, and other data and be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a communications interface 636 (e.g., a network adapter), which is a type of computing device. The computing device 600 may use the communications interface 636 and any other types of computing devices for establishing connections over a wide-area network (WAN) or local-area network (LAN). It should be appreciated that the network connections shown are examples and that other computing devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638, such as a serial port interface, parallel port, or universal serial bus (USB). The computing device 600 may further include a display 622, such as a touch screen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program-specific and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method of generating keyword-based dialogue summaries is provided, the method includes inputting a portion of a transcript of an audio conversation and a predefined keyword into a machine learning model trained based on a first encoding representing the predefined keyword and a second encoding representing text of a portion of a different transcript, generating, by the trained machine learning model, computer-generated text different from and semantically descriptive of at least the portion of the transcript, the computer-generated text semantically associated with the predefined keyword, based on the predefined keyword and the portion of the transcript, and outputting the computer-generated text in association with a selectable item selectable for inclusion of the computer-generated text in displayed text representing the transcript, the selectable item associated with the predefined keyword.

Another example method of any preceding method is provided, further including determining a role of a generator of the portion of the transcript, wherein the operation of inputting further includes inputting the determined role and wherein the operation of generating is further based on the determined role.

Another example method of any preceding method is provided, wherein the outputted computer-generated text includes text representing the role.

Another example method of any preceding method is provided, the method further including receiving a selection of the selectable item from a first portion of a user interface and transmitting an instruction to display the computer-generated text in a second portion of the user interface concurrently displayed with the first portion.

Another example method of any preceding method is provided, the method further including receiving a selection of an industry to which the selector belongs and generating, by a keyword generating model, the predefined keyword based on predefined industry-specific keywords associated with the received selection.

Another example method of any preceding method is provided, the method further including receiving a user selection of the predefined keyword, wherein the operation of inputting is based on the received user selection.

Another example method of any preceding method is provided, the method further including training the machine learning model based on data representing other transcripts as labels and one or more predefined phrases associated with the predefined keyword as targets, wherein the outputted computer-generated text includes the predefined keyword.

An example system for generating keyword-based dialogue summaries is provided. The system includes a computing device including a processor operable to execute instructions stored in memory including a trained machine learning model. The processor is operable to input a portion of a transcript of an audio conversation and a predefined keyword into a machine learning model trained based on a first encoding representing the predefined keyword and a second encoding representing text of a portion of a different transcript, generate, by the trained machine learning model, computer-generated text different from and semantically descriptive of at least the portion of the transcript, the computer-generated text semantically associated with the predefined keyword, based on the predefined keyword and the portion of the transcript, and output the computer-generated text in association with a selectable item selectable for inclusion of the computer-generated text in displayed text representing the transcript, the selectable item associated with the predefined keyword.

Another example system of any preceding system is provided, wherein the processor is further operable to determine a role of a generator of the portion of the transcript, wherein input further includes the determined role, and wherein the generation is further based on the determined role.

Another example system of any preceding system is provided, wherein the outputted computer-generated text includes text representing the role.

Another example system of any preceding system is provided, wherein the processor is further operable to receive a selection of the selectable item from a first portion of a user interface and transmit an instruction to display the computer-generated text in a second portion of the user interface concurrently displayed with the first portion.

Another example system of any preceding system is provided, wherein the processor is further operable to receive a selection of an industry to which the selector belongs and generate the predefined keyword based on predefined industry-specific keywords associated with the received selection.

Another example system of any preceding system is provided, wherein the processor is further operable to receive a user selection of the predefined keyword, wherein the input is based on the received user selection.

Another example system of any preceding system is provided, wherein the processor is further operable to train the machine learning model based on data representing other transcripts as labels and one or more predefined phrases associated with the predefined keyword as targets, wherein the outputted computer-generated text includes the predefined keyword.

One or more example tangible processor-readable storage media embodied with instructions for executing on one or more processors and circuits of a computing device a process for generating keyword-based dialogue summaries, the process including inputting a portion of a transcript of an audio conversation and a predefined keyword into a machine learning model trained based on a first encoding representing the predefined keyword and a second encoding representing text of a portion of a different transcript, generating, by the trained machine learning model, computer-generated text different from and semantically descriptive of at least the portion of the transcript, the computer-generated text semantically associated with the predefined keyword, based on the predefined keyword and the portion of the transcript, and outputting the computer-generated text in association with a selectable item selectable for inclusion of the computer-generated text in displayed text representing the transcript, the selectable item associated with the predefined keyword.

One or more example tangible processor-readable storage media of any preceding media is provided, wherein the process further includes determining a role of a generator of the portion of the transcript, wherein the operation of inputting further includes inputting the determined role and wherein the operation of generating is further based on the determined role.

One or more example tangible processor-readable storage media of any preceding media is provided, wherein the outputted computer-generated text includes text representing the role.

One or more example tangible processor-readable storage media of any preceding media is provided, wherein the process further includes receiving a selection of the selectable item from a first portion of a user interface and transmitting an instruction to display the computer-generated text in a second portion of the user interface concurrently displayed with the first portion.

One or more example tangible processor-readable storage media of any preceding media is provided, wherein the process further includes receiving a selection of an industry to which the selector belongs and generating, by a keyword generating model, the predefined keyword based on predefined industry-specific keywords associated with the received selection.

One or more example tangible processor-readable storage media of any preceding media is provided, wherein the process further includes receiving a user selection of the predefined keyword, wherein the operation of inputting is based on the received user selection.

An example system for generating keyword-based dialogue summaries is provided. The system includes means for inputting a portion of a transcript of an audio conversation and a predefined keyword into a machine learning model trained based on a first encoding representing the predefined keyword and a second encoding representing text of a portion of a different transcript, means for generating, by the trained machine learning model, computer-generated text different from and semantically descriptive of at least the portion of the transcript, the computer-generated text semantically associated with the predefined keyword, based on the predefined keyword and the portion of the transcript, and means for outputting the computer-generated text in association with a selectable item selectable for inclusion of the computer-generated text in displayed text representing the transcript, the selectable item associated with the predefined keyword.

Another example system of any preceding system is provided, further including means for determining a role of a generator of the portion of the transcript, wherein the means for inputting further includes means for inputting the determined role and wherein means for generating generates the computer-generated text further based on the determined role.

Another example system of any preceding system is provided, wherein the outputted computer-generated text includes text representing the role.

Another example system of any preceding system is provided, the system further including means for receiving a selection of the selectable item from a first portion of a user interface and means for transmitting an instruction to display the computer-generated text in a second portion of the user interface concurrently displayed with the first portion.

Another example system of any preceding system is provided, the system further including means for receiving a selection of an industry to which the selector belongs and means for generating, by a keyword generating model, the predefined keyword based on predefined industry-specific keywords associated with the received selection.

Another example system of any preceding system is provided, the system further including means for receiving a user selection of the predefined keyword, wherein the means for inputting inputs based on the received user selection.

Another example system of any preceding system is provided, the system further including means for training the machine learning model based on data representing other transcripts as labels and one or more predefined phrases associated with the predefined keyword as targets, wherein the outputted computer-generated text includes the predefined keyword.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

As used herein, terms such as "substantially," "about," "approximately," or other terms of relative degree are interpreted as a person skilled in the art would interpret the terms and/or amount to a magnitude of variability of one or more of 1%, 2%, 3%, 4%, 5%, 6%, 7%, 8%, 9%, 10%, 11%, 12%, 13%, 14%, or 15% of a metric relative to the quantitative or qualitative feature described. For example, a term of relative degree applied to orthogonality suggests an angle may have a magnitude of variability relative to a right angle. When values are presented herein for particular features and/or a magnitude of variability, ranges above, ranges below, and ranges between the values are contemplated.

What is claimed is:

1. A method of generating keyword-based dialogue summaries, the method comprising:
   inputting a portion of a transcript of an audio conversation and a predefined keyword into a machine learning model trained based on a first encoding representing the predefined keyword and a second encoding representing text of a portion of a different transcript;
   generating, by the trained machine learning model, computer-generated text different from and semantically descriptive of at least the portion of the transcript, the computer-generated text semantically associated with the predefined keyword, based on the predefined keyword and the portion of the transcript;
   providing a user interface including a summary text interface portion including a displayed summary text representing the transcript and a selectable item portion including at least a selectable item associated with the predefined keyword; and
   responsive to detecting a selection of the selectable item, transforming the summary text interface portion of the user interface to include the computer-generated text within the displayed summary text of the summary text interface portion.

2. The method of claim 1, further comprising:
   determining a role of a generator of the portion of the transcript, wherein the operation of inputting further includes inputting the determined role and wherein the operation of generating is further based on the determined role.

3. The method of claim 2, wherein the outputted computer-generated text includes text representing the role.

4. The method of claim 1, the method further comprising:
   receiving a selection of the selectable item from a first portion of a user interface; and
   transmitting an instruction to display the computer-generated text in a second portion of the user interface concurrently displayed with the first portion.

5. The method of claim 1, the method further comprising:
   receiving a selection of an industry to which a selector belongs; and
   generating, by a keyword generating model, the predefined keyword based on predefined industry-specific keywords associated with the received selection.

6. The method of claim 1, the method further comprising:
   receiving a user selection of the predefined keyword, wherein the operation of inputting is based on the received user selection.

7. The method of claim 1, the method further comprising:
   training the machine learning model based on data representing other transcripts as labels and one or more predefined phrases associated with the predefined keyword as targets, wherein the computer-generated text includes the predefined keyword.

8. A system for generating keyword-based dialogue summaries, the system comprising:
   a computing device including a processor operable to execute instructions stored in memory including a trained machine learning model, the processor operable to:
      input a portion of a transcript of an audio conversation and a predefined keyword into the trained machine learning model trained based on a first encoding representing the predefined keyword and a second encoding representing text of a portion of a different transcript;
      generate, by the trained machine learning model, computer-generated text different from and semantically descriptive of at least the portion of the transcript, the computer-generated text semantically associated with the predefined keyword, based on the predefined keyword and the portion of the transcript;
      provide a user interface including a summary text interface portion including a displayed summary text representing the transcript and a selectable item portion including at least a selectable item associated with the predefined keyword; and
      responsive to detecting a selection of the selectable item, transforming the summary text interface portion of the user interface to include the computer-generated text within the displayed summary of the summary text interface portion.

9. The system of claim 8, the processor further operable to:
   determine a role of a generator of the portion of the transcript, wherein input further includes the determined role and wherein the generation is further based on the determined role.

10. The system of claim 9, wherein the computer-generated text includes text representing the role.

11. The system of claim 8, the processor further operable to:
   receive a selection of the selectable item from a first portion of a user interface; and
   transmit an instruction to display the computer-generated text in a second portion of the user interface concurrently displayed with the first portion.

12. The system of claim 8, the processor further operable to:
   receive a selection of an industry to which a selector belongs; and
   generate the predefined keyword based on predefined industry-specific keywords associated with the received selection.

13. The system of claim 8, the processor further operable to:
   receive a user selection of the predefined keyword, wherein the input is based on the received user selection.

14. The system of claim 8, the processor further operable to:
   train a machine learning model based on data representing other transcripts as labels and one or more predefined phrases associated with the predefined keyword as targets to generate the trained machine learning model, wherein the computer-generated text includes the predefined keyword.

15. A computer program product, comprising:
   one or more tangible processor-readable storage media embodied with instructions for executing on one or more processors and circuits of a computing device a process for generating keyword-based dialogue summaries, the process comprising:
   inputting a portion of a transcript of an audio conversation and a predefined keyword into a machine learning model trained based on a first encoding representing the predefined keyword and a second encoding representing text of a portion of a different transcript;
   generating, by the trained machine learning model, computer-generated text different from and semantically descriptive of at least the portion of the transcript, the computer-generated text semantically associated with the predefined keyword, based on the predefined keyword and the portion of the transcript;
   providing a user interface including a summary text interface portion including a displayed summary text representing the transcript and a selectable item portion including at least a selectable item associated with the predefined keyword; and
   responsive to detecting a selection of the selectable item, transforming the summary text interface portion of the user interface to include the computer-generated text within the displayed summary text of the summary text interface portion.

16. The computer program product of claim 15, the process further comprising:
   determining a role of a generator of the portion of the transcript, wherein the operation of inputting further includes inputting the determined role and wherein the operation of generating is further based on the determined role.

17. The computer program product of claim 16, wherein the computer-generated text includes text representing the role.

18. The computer program product of claim 15, the process further comprising:
   receiving a selection of the selectable item from a first portion of a user interface; and
   transmitting an instruction to display the computer-generated text in a second portion of the user interface concurrently displayed with the first portion.

19. The computer program product of claim 15, the process further comprising:
   receiving a selection of an industry to which a selector belongs; and
   generating, by a keyword generating model, the predefined keyword based on predefined industry-specific keywords associated with the received selection.

20. The computer program product of claim 15, the process further comprising:
   receiving a user selection of the predefined keyword, wherein the operation of inputting is based on the received user selection.

* * * * *